United States Patent [19]

Witt

[11] Patent Number: 4,838,028
[45] Date of Patent: Jun. 13, 1989

[54] COOLING AND DAMPING ARRANGEMENT FOR GAS TURBINE BEARINGS

[75] Inventor: Arnold Witt, Oberursel, Fed. Rep. of Germany

[73] Assignee: Kloeckner-Humboldt-Deutz AG, Fed. Rep. of Germany

[21] Appl. No.: 186,776

[22] Filed: Apr. 25, 1988

Related U.S. Application Data

[63] Continuation of Ser. No. 13,360, Feb. 11, 1987, abandoned.

[30] Foreign Application Priority Data

Feb. 14, 1986 [DE] Fed. Rep. of Germany ....... 3604625

[51] Int. Cl.⁴ ............................................... F02C 7/12
[52] U.S. Cl. .................................... 60/736; 60/39.83; 384/99; 415/180
[58] Field of Search ................... 60/39.83, 39.08, 736; 384/99, 476, 900, 535; 184/6.11; 415/175, 180

[56] References Cited

U.S. PATENT DOCUMENTS

| | | | |
|---|---|---|---|
| 2,676,458 | 4/1954 | Hill | 60/39.08 |
| 2,784,551 | 3/1957 | Karlby et al. | 60/39.08 |
| 4,080,783 | 3/1978 | Hamburg et al. | 60/39.08 |
| 4,084,861 | 4/1978 | Greenberg et al. | 384/99 |
| 4,337,983 | 7/1982 | Hibner | 384/99 |
| 4,527,911 | 7/1985 | Davis | 384/99 |
| 4,669,893 | 6/1987 | Chalaire et al. | 384/99 |

FOREIGN PATENT DOCUMENTS

1196016 4/1966 Fed. Rep. of Germany.
1435576 5/1976 United Kingdom .................. 384/99

Primary Examiner—Donald E. Stout
Attorney, Agent, or Firm—Charles L. Schwab

[57] ABSTRACT

A rotor bearing on the turbine side of a gas turbine is surrounded by a concentric cavity through which fuel is routed from its source to the turbine combustion chamber. The fuel of the gas turbine is used as the coolant for the rotor bearing and at the same time the concentric cavity surrounding the bearing forms a hydraulic "compression" film damping device.

5 Claims, 3 Drawing Sheets

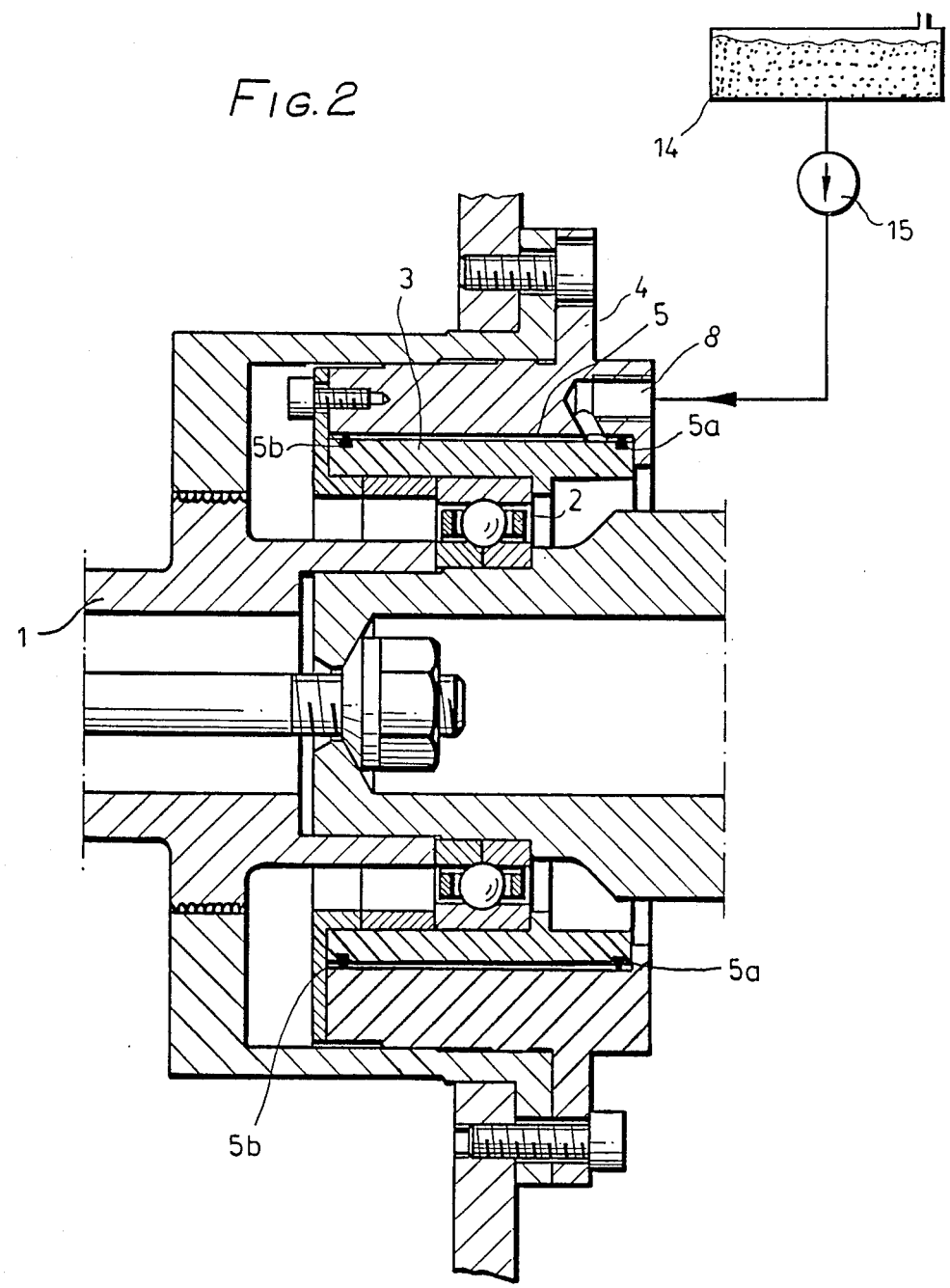

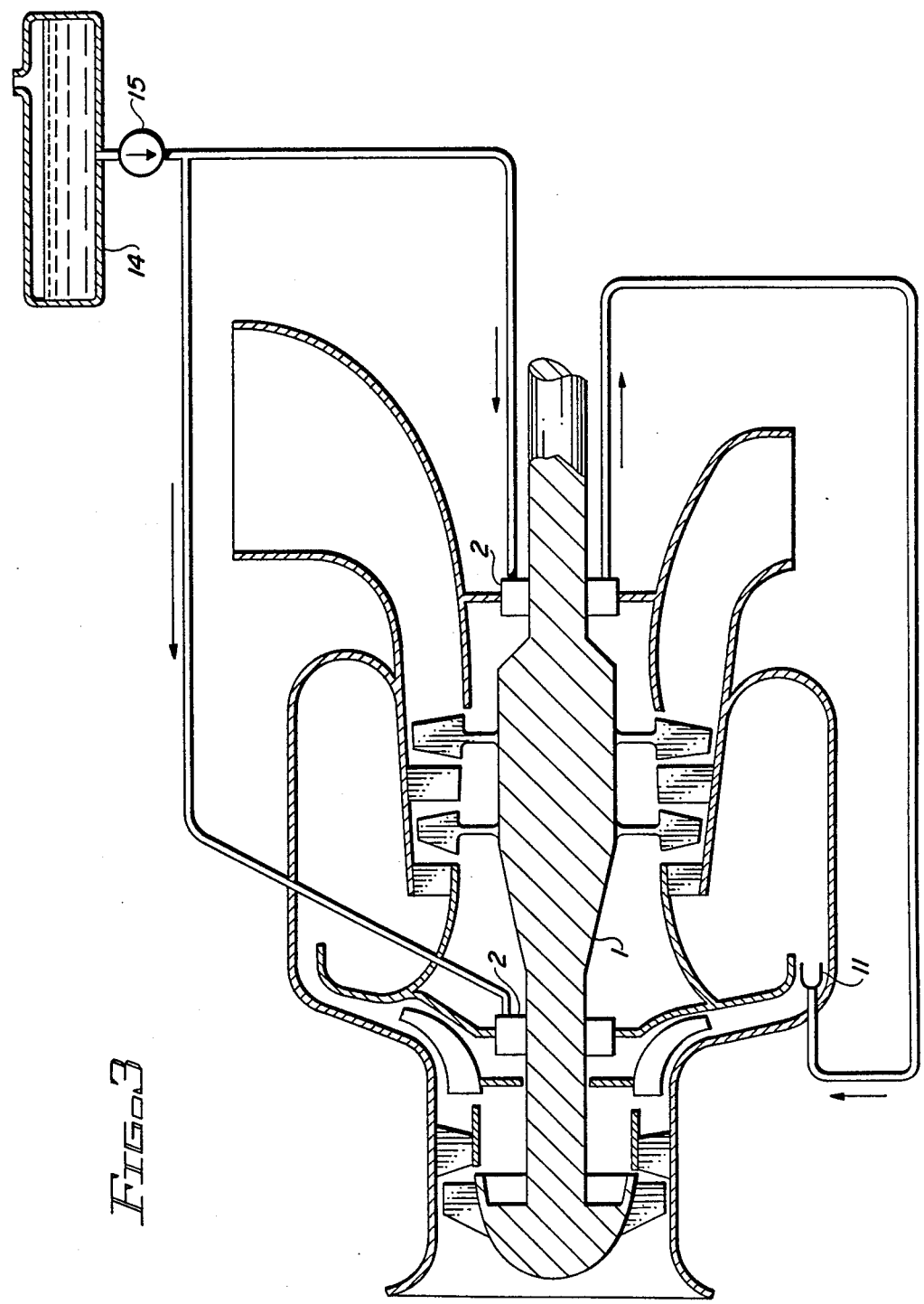

COOLING AND DAMPING ARRANGEMENT FOR GAS TURBINE BEARINGS

This application is a continuation of application Ser. No. 013,360, filed Feb. 11, 1987, now abandoned.

BACKGROUND OF THE INVENTION

1. TECHNICAL FIELD

This invention relates to gas turbines and more specifically to the bearing arrangement for the rotor of a gas turbine.

2. PRIOR ART STATEMENT

In gas turbines, the rotor bearing is cooled for the most part by the compressor and the turbine. On the one hand, excessive heat develops because of friction energy and on the other hand, the combustion chamber and the turbine become very hot because of the function they perform, so that the heat is transferred from there to the bearing. In order to avoid a separate coolant circuit, the fuel from the gas turbine has been used as the coolant. In order to achieve the bearing cooling function, the fuel is routed unidirectionally from the fuel tank over the bearing and then directly into the combustion chamber.

One bearing cooling arrangement is shown and described in West German patent DE-PS No. 11 96 016. The fuel from the gas turbine is led to the cooling points of the rotor arrangement and flows from there back into the tank. The fuel also serves as a lubricant for the bearing. No measures are provided for a bearing damping device, which would be complicated in a rotor bearing cooled in this way.

OBJECTS AND BRIEF SUMMARY OF THE INVENTION

A main object of this invention is to provide a fuel cooled bearing of a gas turbine with a bearing damping device.

This invention is particularly useful in a gas turbine having a combustion chamber, a turbine, a compressor, and a rotor. A bearing for the rotor is supported by a support structure which includes wall means defining a ring-shaped, sealed-off cavity surrounding said bearing and having a fuel inlet and a fuel outlet. The cavity, which is supplied with fuel, acts as a hydraulic bearing damping device and, at the same time, the bearing is cooled as the fuel passes through the cavity. The cavity is preferably dimensioned and arranged in relation to the bearing so as to constitute a compression film damping device. By connecting the cavity outlet to the combustion chamber, the circuit and space requirements are held to a minimum. Annular grooves may be formed at axially opposite ends of the cavity to ensure a laminar flow of fuel through the cavity. In the illustrated version of the invention, an antifriction bearing is supported within a bushing, the bushing is supported by a casing and the cavity is provided in the radial space between the bushing and the casing. In such a construction, it is desirable to provide a pair of annular seals between the bushing and casing at opposite ends, respectively, of the cavity.

During operation, fuel flows into the cavity via the fuel inlet connected to the annular groove at one axial end of the cavity and exits via the fuel outlet connected to the annular groove at the other axial end of the cavity. The distribution of the fuel over the perimeter of the bushing cools the bushing and the bearing supported therein. At the same time, the cavity, which surrounds the bearing, also functions as a compression film damping device. Thus, additional auxiliary equipment for damping the bearing is not needed. In order to avoid a separate cooling circuit, the fuel of the gas turbine is used as the coolant. This is accomplished by routing the fuel through the damping cavity en route to the combustion chamber.

This invention is used to advantage in gas turbines which are used only one time, such as jet powered unmanned missiles or drones. In the case of such jet powered units, the requirements are for the very least construction cost and for great reliability.

The bearing may be a simple antifriction ball bearing with oil, grease or fuel lubrication. This invention provides simultaneous cooling and damping of the bearing by using the fuel of the gas turbine, thus eliminating the need for separate auxiliary items to perform these functions. The construction costs are thus kept as low as possible, so that minimum structural space and weight are achieved.

It can prove expedient to equip a gas turbine with separate bearings for supporting the rotor on its compressor side and on its turbine side wherein a damping and cooling cavity is provided for each of the bearings, but only the bearing on the turbine side is provided with a fuel outlet as well as a fuel inlet. Thus, the fuel cools only the bearing on the turbine side, while the fuel inlet to the cavity for the bearing on the compressor side supplies a damping device, and the fuel in the bearing on the compressor side does not perform a cooling function. This is a practical arrangement for bearings for gas turbine rotors because of the lower temperatures on the compressor side of the gas turbine.

BRIEF DESCRIPTION OF THE DRAWINGS

The invention is illustrated in the drawings in which:

FIG. 2 is a longitudinal section through the rotor and bearing on the compressor side of the gas turbine; and FIG. 3 is a schematic longitudinal section of the gas turbine showing the fuel flow path to the bearings on the compressor and turbine sides of the gas turbine.

DETAILED DESCRIPTION OF THE DRAWINGS

Figure 1:
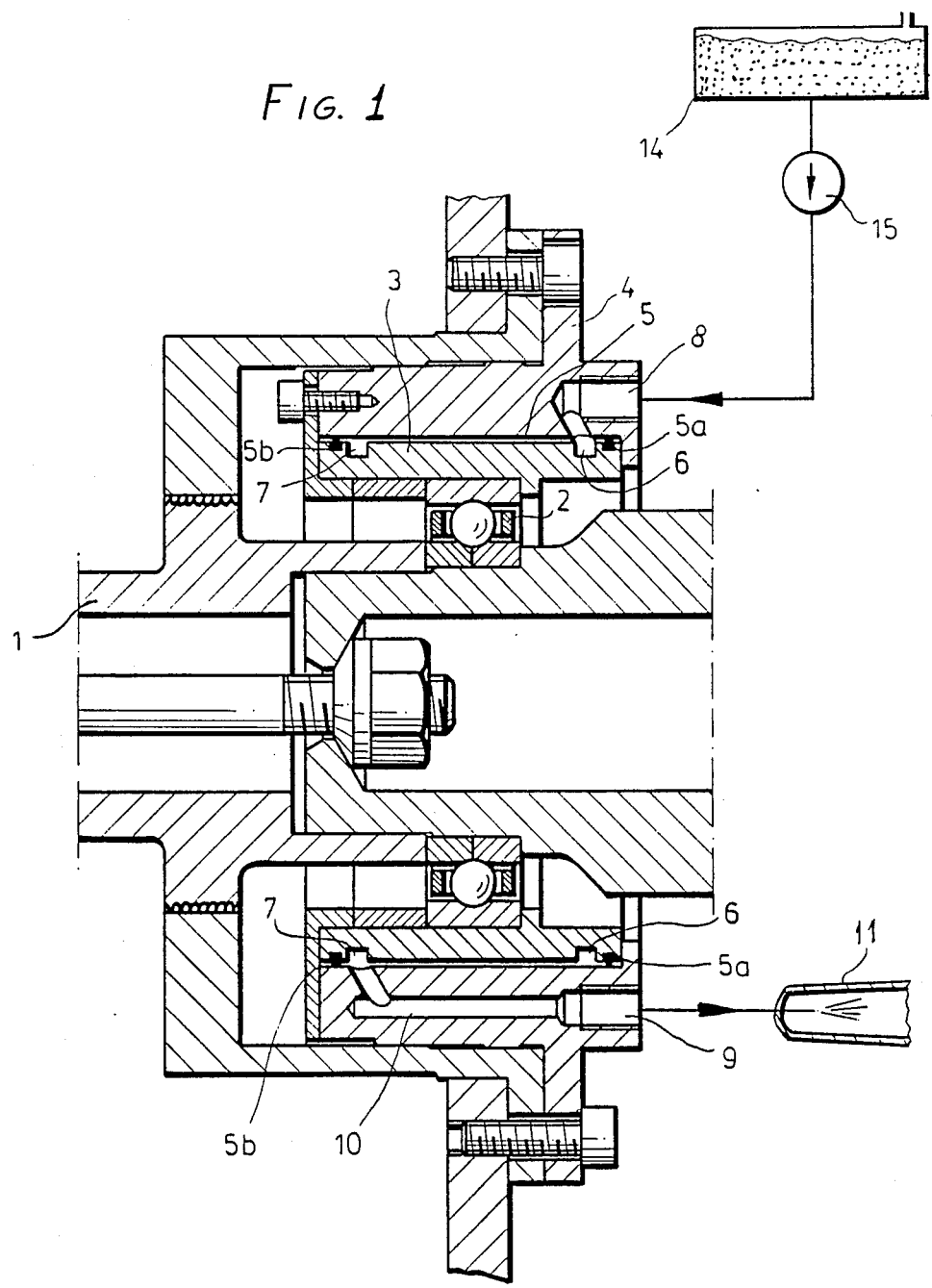
FIG. 1 is a longitudinal section through the rotor and bearing on the turbine side of the gas turbine.

Referring to FIG. 1, a bearing 2 rotatably supports a bipartite rotor 1 and, as shown, is an antifriction ball bearing. The inner raceway of the bearing is secured on the rotor 1 in a manner preventing relative axial movement. The outer raceway of the bearing 2 is secured to and supported by a concentric bushing 3, which is concentric to and secured to a casing 4. The casing 4 is nonrotatably secured to the housing of the gas turbine. The bushing 3 and the casing 4 constitute a bearing support structure. The illustrated rotor 1 is on the turbine side of the gas turbine and another such bearing supports the rotor on the compressor side of the gas turbine.

Wall means in the form of radially inward and outward facing cylindrical surfaces on the casing 4 and the bushing 3 define a radial clearance forming a damping and cooling cavity 5 extending axially along the axial length of bushing 3. At axially opposite ends of the concentric cavity 5, annular grooves 6 and 7 are formed, respectively, in the bushing 3. The annular grooves 6 and 7 could also be formed in the casing 4 or in both components of the bushing and casing. Annular seal rings 5a, 5b are disposed at opposite axial ends, respectively, of the cavity 5 in sealing relation to and radially between the bushing 3 and the casing 4. Annular grooves 6 and 7 are located between the seals 5a, 5b, preferably adjacent to the corresponding seal. O-ring seals or piston rings are the preferred seals.

The annular groove 6 is connected to an axially extending fuel inlet 8 in casing 4, and the annular groove 7 is connected to a fuel outlet 9 in casing 4. Fuel inlet 8 and fuel outlet 9 are threaded and connect with the grooves 6 and 7 by drilled passageways such as borehole 10.

A source of fuel in the form of a fuel tank 14 is connected via a fuel pump 15 to the fuel inlet 8, while the fuel outlet 9 is connected with the separate combustion chamber of the gas turbine and, as the case may be, a control device. It must be ensured that fuel flows through the cavity 5 over the entire perimeter of the bushing 3 and then discharges from the cavity 5.

This is achieved by delivering pressurized fuel via the fuel inlet 8 to the annular groove 6 at one axial end of the cavity 5. The annular groove 6 serves to evenly distribute the fuel to the cavity 5 over the outer circumference of the bushing 3. The fuel has a laminar flow through cavity 5 and is collected in the annular groove 7 from which it is fed via fuel outlet 9 to the combustion chamber, not shown.

If the cooling requirements for the bearing 2 are high, all of the fuel which is necessary for operating the gas turbine can be directed through the cavity 5. Cooling by means of a partial flow is sufficient in many cases. The fuel in the cavity 5 also acts as a hydraulic damping device with respect to shocks and vibrations which are caused by rotor 1. The operation of rotor 1 is thus rendered quieter. In the case of bearings which are not subjected to high temperatures, for example, the bearing supporting the rotor on the compressor side of a gas turbine, as is shown in FIG. 2, cooling is not required. The cavity 5 for such the bearing 2 shown in FIG. 2 needs only a fuel inlet 8 and a fuel outlet has been deleted. FIG. 3 illustrates the fuel flow path to the compressor side bearing 2 at the left hand side of the illustration and to the turbine side bearing 2 at the right hand side of the illustration.

The embodiments of the invention in which an exclusive property or privilege is claimed are defined as follows:

1. In combination: a gas turbine housing for a gas turbine having a turbine side and a compressor side, a gas turbine combustion chamber, a gas turbine rotor, an annular bearing surrounding and rotatably said rotor on said turbine side, a bearing support structure including a bushing concentrically surrounding and mounting said bearing presenting a radially outward facing cylindrical surface, a radially inward facing cylindrical surface on said housing in radially outward spaced and generally coaxial relation to said radially outward facing cylindrical surface, said cylindrical surfaces defining a ring-shaped, sealed-off cylindrical cavity concentrically surrounding said bearing and extending axially a distance at least equal to the axial width of said bearing, a fuel inlet connected to one axial end of said cylindrical cavity, a fuel outlet passageway connected to the other axial end of said cylindrical cavity, said fuel outlet passageway being connected to said combustion chamber and a source of fuel connected in fuel supplying relation to said fuel inlet whereby fuel is supplied to said cavity, said cavity acting as a hydraulic compression film bearing damping device when filled with fuel and said fuel cooling said bearing as it passes by laminar flow axially across substantially the full axial width of said cylindrical surfaces and exits via said outlet passageway.

2. The combination of claim 1 and further comprising an additional bearing on said compressor side of surrounded by a concentric cavity supplied with fuel through a fuel inlet.

3. The combination of claim 1 wherein said bearing support structure includes a casing releasably secured to said housing and presenting said radially inward facing cylindrical surface.

4. The combination of claim 3 wherein said bearing support structure includes an annular fuel distributing groove at one axial end of said cavity connected to said fuel inlet and an annular fuel distributing groove at the other axial end of said cavity connected to said fuel outlet passageway.

5. The combination of claim 4 and further comprising a pair of annular seals between said bushing and said casing and disposed, respectively, at axially opposite ends of said cavity and on axially outer sides of said grooves.

* * * * *

UNITED STATES PATENT AND TRADEMARK OFFICE
CERTIFICATE OF CORRECTION

PATENT NO. : 4,838,028
DATED : June 13, 1989
INVENTOR(S) : Arnold Witt

It is certified that error appears in the above-identified patent and that said Letters Patent is hereby corrected as shown below:

Column 4, line 7, insert "supporting" after "rotatably"

Signed and Sealed this

Tenth Day of April, 1990

Attest:

HARRY F. MANBECK, JR.

*Attesting Officer*    *Commissioner of Patents and Trademarks*